UNITED STATES PATENT OFFICE.

HENRY PETERS, OF LONDON, ENGLAND, ASSIGNOR OF ONE-HALF TO HORACE WAYTH CULLUM, OF LONDON, ENGLAND.

TREATMENT OF CELLULOSE.

1,008,557.     Specification of Letters Patent.     Patented Nov. 14, 1911.

No Drawing.     Application filed September 5, 1911. Serial No. 647,721.

*To all whom it may concern:*

Be it known that I, HENRY PETERS, of 24 Tavistock Square, in the county of London, England, chemist, have invented certain new and useful Improvements Relating to the Treatment of Cellulose, of which the following is a specification.

This invention relates to the treatment of cellulose whereby the same can be brought into a form particularly adapted for the preparation of solutions capable of application for the manufacture of films, threads, coatings, molded articles, and the like.

According to the invention I heat the cellulose for some time with dichlorhydrin or epichlorhydrin containing palmitic acid and after cooling the mass of cellulose and removing the adherent dichlorhydrin or epichlorhydrin I treat it with a solution containing formic acid together with a solvent such as methylated spirit and I then subject the cellulose product to the action of an acetylizing bath which may consist in substance of sulfuric acid, sodium acetate, acetic anhydrid and a condensing agent such as glacial acetic acid. The resulting cellulose product may then be treated with a neutralizing solution, preferably a solution of ammonium carbonate in a volatile solvent such as methylated spirit, and the product may be finally washed with water containing ammonium carbonate or other neutralizing agent and finally washed with water and dried.

In carrying out the invention I may proceed, for example, as follows:—

Example: 1 kg. raw cellulose is heated for about 4 hours in 8 liters of dichlorhydrin or epichlorhydrin and about 50 grams of palmitic acid the temperature being maintained at about 120° C. After the mass has been allowed to cool, the dichlorhydrin or epichlorhydrin is pressed out thoroughly and the cellulose is dried. The cellulose is then put into a bath consisting of 1,000 grams methylated spirit and 50 grams acidum formicicum ($HCO_2H$). The cellulose is steeped or pressed until it has been thoroughly impregnated by the liquid. After 4 hours the mass it put into an acetylizing bath consisting preferably of:—3½ liters glacial acetic acid or other condensing agent; 3 liters acetic anhydrid; 100 grams sulfuric acid; 10 grams sodium acetate. This mass must be cooled down and always kept below 50° C. After about 10 hours the whole is poured into methylated spirit containing about 30 grams ammonium carbonate per liter. The cellulose product is left in this for about 6 hours, then the liquid is filtered off and the product is put into water containing 30 grams ammonium carbonate per liter. Then the product is well washed and dried. A cellulose product prepared in this manner dissolves very easily in acetone, glacial acetic acid and other solvents, and only needs about half the quantity of solvents required for ordinary cellulose acetate. It forms very strong, non-inflammable films and retains its elasticity.

What I claim and desire to secure by Letters Patent is:—

1. A process for the treatment of cellulose, comprising (*a*) heating the cellulose with a chlorhydrin body containing palmitic acid; (*b*) treatment subsequently with a solution of formic acid and a volatile solvent; (*c*) subjecting the resulting product to the action of an acetylizing bath, substantially as described.

2. A process for the treatment of cellulose, comprising (*a*) heating the cellulose with dichlorhydrin containing palmitic acid, (*b*) subsequent treatment with a solution of formic acid and a volatile solvent; (*c*) subjecting the resulting product to the action of an acetylizing bath containing sulfuric acid, substantially as described.

3. A process for the treatment of cellulose comprising (*a*) heating the cellulose with dichlorhydrin containing palmitic acid at a temperature of about 120° C.; (*b*) subsequent treatment with a solution of formic acid and alcohol, (*c*) subjecting the resulting product to the action of an acetylizing bath consisting in substance of acetic anhydrid, an alkali acetate, sulfuric acid and a condensing agent substantially as described.

4. A process for the treatment of cellulose comprising (*a*) heating the cellulose with a chlorhydrin body containing palmitic acid, (*b*) subsequent treatment with a solution of formic acid and a volatile solvent; (*c*) subjecting the resulting product to the action of an acetylizing bath; (*d*) neutralizing, washing and drying the resulting product.

5. A process for the treatment of cellulose, comprising (a) heating the cellulose with a chlorhydrin body containing palmitic acid and removal of remaining chlorhydrin body and palmitic acid; (b) subsequent treatment with a solution of formic acid and a volatile solvent; (c) subjecting the resulting product to the action of an acetylizing bath consisting in substance of acetic anhydrid, sodium acetate, sulfuric acid, and a condensing agent.

6. A process for the treatment of cellulose, comprising heating the same with a mixture of a chlorhydrin body and palmitic acid.

7. A process for the treatment of cellulose comprising heating the same with a mixture of dichlorhydrin and palmitic acid.

In testimony whereof I have hereunto set my hand in presence of two subscribing witnesses.

HENRY PETERS.

Witnesses:
HENRY ALLEN PRYOR,
ROBERT MILTON SPEARPOINT.